United States Patent [19]

Norton et al.

[11] 4,344,455

[45] Aug. 17, 1982

[54] COUPLING ASSEMBLY

[75] Inventors: James F. Norton, Berea; Richard J. Silagy, Parma; Walter W. Antoniw, Lakewood, all of Ohio

[73] Assignee: Tuthill Corporation, Cleveland, Ohio

[21] Appl. No.: 178,866

[22] Filed: Aug. 18, 1980

[51] Int. Cl.³ .................. F16K 43/00; F16L 37/28
[52] U.S. Cl. .................. 137/329.4; 137/360; 137/614; 137/614.05; 137/614.19; 251/149.6; 285/316; 285/DIG. 15
[58] Field of Search .............. 137/329.1, 329.2, 329.3, 137/329.4, 360, 614.05, 614.19, 614.21; 251/143, 149.6, 148, 151, 152; 285/316, 320, 321, DIG. 15

[56] References Cited

U.S. PATENT DOCUMENTS

| Re. 28,334 | 2/1975 | Cranage | 137/360 |
|---|---|---|---|
| 2,099,335 | 11/1937 | Honsen | 251/149.6 |
| 2,415,701 | 2/1947 | Midgett | 251/149 |
| 2,771,308 | 11/1956 | Vitcha et al. | 285/317 |
| 3,170,667 | 2/1965 | Szohatzky | 251/149.6 |
| 3,234,965 | 2/1966 | Anderson | 285/316 |
| 3,288,429 | 11/1966 | Termini | 251/149.1 |
| 3,477,105 | 11/1969 | Cranage | 251/149.1 |
| 3,532,101 | 10/1970 | Snyder | 137/75 |
| 3,544,257 | 12/1970 | Cranage | 251/149.6 X |
| 3,563,267 | 2/1971 | Thompson | 137/329.1 |
| 4,139,222 | 2/1979 | Loland | 285/316 X |

Primary Examiner—A. Michael Chambers
Attorney, Agent, or Firm—Yount & Tarolli

[57] ABSTRACT

An improved coupling assembly includes a socket assembly which telescopically receives a plug to connect a pair of conduits in fluid communication. The plug is movable from a disengaged position to a storage position in which the plug is supported by and is telescopically disposed in the socket assembly. The plug can be moved further into the socket assembly to an engaged position in which the conduits are connected in fluid communication. The plug is securely held in the engaged position by locking elements. The plug is releasably gripped in the storage position by a plurality of detents. The detents are mounted on a sleeve which extends through an opening in a faceplate. An actuator flange is disposed on an outer end portion of the sleeve to enable it to be readily depressed. The fluid which is to be conducted through the coupling assembly is identified by the indicia on the sleeve and by similar indicia on the mounting plate. The socket assembly is constructed in two sections with an interlock to prevent connection of an outer socket section with a wrong inner socket section.

67 Claims, 9 Drawing Figures

COUPLING ASSEMBLY

BACKGROUND OF THE INVENTION

The present invention relates to a new and improved coupling assembly and more specifically to a coupling assembly which is used to connect a pair of conduits in fluid communication. Although the coupling assembly may be used in many different environments, it is advantageously used in hospitals, laboratories and similar environments.

It is a common practice to connect conduits in fluid communication using plug and socket-type coupling assemblies. Plug and socket type coupling assemblies have been used in hospitals to conduct gases, such as oxygen, between wall mounted sockets connected with a supply of the gas and plugs connected with various types of equipment. One proposed coupling assembly for use in hospitals is disclosed in U.S. Pat. No. 3,477,105. Various other wall mounted coupling assemblies for use in connecting conduits in fluid communication are disclosed in U.S. Pat. Nos. 2,415,701; 3,474,810; and 3,532,101.

When a plug is used with a socket, it may be desirable to store the plug in an inactive or storage position in which a valve in the socket blocks fluid flow between the plug and the socket. When the plug is in the storage position, it is advantageously aligned with the socket so that it can be fully inserted into the socket by merely pressing it axially toward the socket. It is believed that such an arrangement would be particularly advantageous in association with hospital equipment which must be idle for substantial periods of time and quickly activated when needed.

By storing the plug in axial alignment with the socket, equipment for adding and/or removing material from a gas connected to the conduit can be mounted in association with the plug and supported by the socket along with the plug. It has been suggested in U.S. Pat. No. 2,099,335 that a plug could be stored in alignment with a socket. It has also been suggested in U.S. Pat. No. 3,288,429 that a flask could be connected with a plug stored in alignment with a socket.

SUMMARY OF THE PRESENT INVENTION

The present invention relates to a coupling assembly which is used to connect a pair of conduits in fluid communication. The coupling assembly includes a socket assembly which is connected with one of the conduits and telescopically receives a plug. The plug is movable from a disengaged position spaced from the socket assembly to a storage position in which the plug is telescopically received in and supported by the socket assembly. The plug can be pressed further into the socket assembly to connect two conduits in fluid communication.

In order to prevent the plug from being jerked out of the socket assembly with a resulting disconnecting of the conduits, when the coupling assembly is connected the plug is securely held in the engaged position by a plurality of locking elements. However, it is contemplated that the plug will be manually movable from the storage position either inwardly to the engaged position or outwardly to the disengaged position. In order to prevent inadvertent movement of the plug from the storage position, detents are provided to hold the plug in the storage position with a gripping action which can be manually overcome.

The locking elements in the socket assembly are held in place when the plug is in the engaged position by a retainer surface which is connected with an axially movable sleeve. The axially movable sleeve extends through an opening in a faceplate and is held against rotation by an interconnection between the sleeve and a base or mounting plate. Since the sleeve is held against rotational movement, indicia identifying a gas to be conducted through the coupling assembly is disposed on the portion of the sleeve which projects outwardly from the faceplate.

Mounting of the coupling assembly on a wall or other support structure is facilitated by providing a receptacle or outlet in which the socket assembly is received. In order to enable the orientation of a conduit connected with the wall mounted socket assembly to be varied, the socket assembly includes a swivel connector which is freely rotatable relative to a backwall or baseplate of a mounting for the socket assembly. Installing the socket assembly in a wall or other support structure is facilitated by mounting an inner portion of the socket assembly on the baseplate. An outer portion of the socket assembly is subsequently connected with the baseplate.

In order to be certain that the desired gas or other fluid is conducted through the coupling assembly, the baseplate is provided with indicia to identify the fluid. Similar indicia is provided on the sleeve at a location disposed outside of the faceplate. The sleeve and baseplate have an interconnection which functions as an interlock and corresponds to a particular type of fluid to prevent an outer socket section from being mounted on the wrong inner socket section. The plug which is to be telescopically received in the socket assembly has a noncircular outer side surface with a configuration which corresponds to the configuration of an opening into which the plug is telescopically inserted. In order to maintain the indicia on the sleeve in a desired orientation relative to a wall or other support structure, the sleeve is held against rotation by an interconnection between the sleeve and the baseplate.

Accordingly, it is an object of this invention to provide a new and improved coupling assembly for use in connecting a pair of conduits in fluid communication and wherein a socket telescopically receives a plug which is axially movable between a disengaged position spaced from the socket, a storage position in which the plug is supported by the socket, and an engaged position in which the plug is fully inserted into the socket, the plug being held in the engaged position with a locking action which cannot be manually overcome and being held in the storage position by a gripping action which can be manually overcome.

Another object of this invention is to provide a new and improved coupling assembly for use in connecting a pair of conduits in fluid communication and wherein the coupling assembly includes a socket having a sleeve which extends through an opening in a faceplate connected with a support structure.

Another object of this invention is to provide a new and improved coupling assembly for use in connecting a pair of conduits in fluid communication and wherein the coupling assembly includes a socket having a sleeve with indicia indicative of the fluid to be conducted through the conduits, the sleeve being held against rotation so that the indicia remains in a desired orientation.

Another object of this invention is to provide a new and improved coupling assembly for use in connecting a pair of conduits in fluid communication and wherein the coupling assembly includes a socket which is readily mounted on a support structure.

Another object of this invention is to provide a new and improved coupling assembly for use in connecting a pair of conduits in fluid communication and wherein indicia on a socket and indicia on a socket mounting plate identify the fluid to be conducted through the coupling assembly.

Another object of this invention is to provide a new and improved coupling assembly having a socket which is formed in two sections with an interlock to prevent the connection of a socket section associated with one type of fluid from being connected with a socket section associated with another type of fluid.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

General

Figure 1:
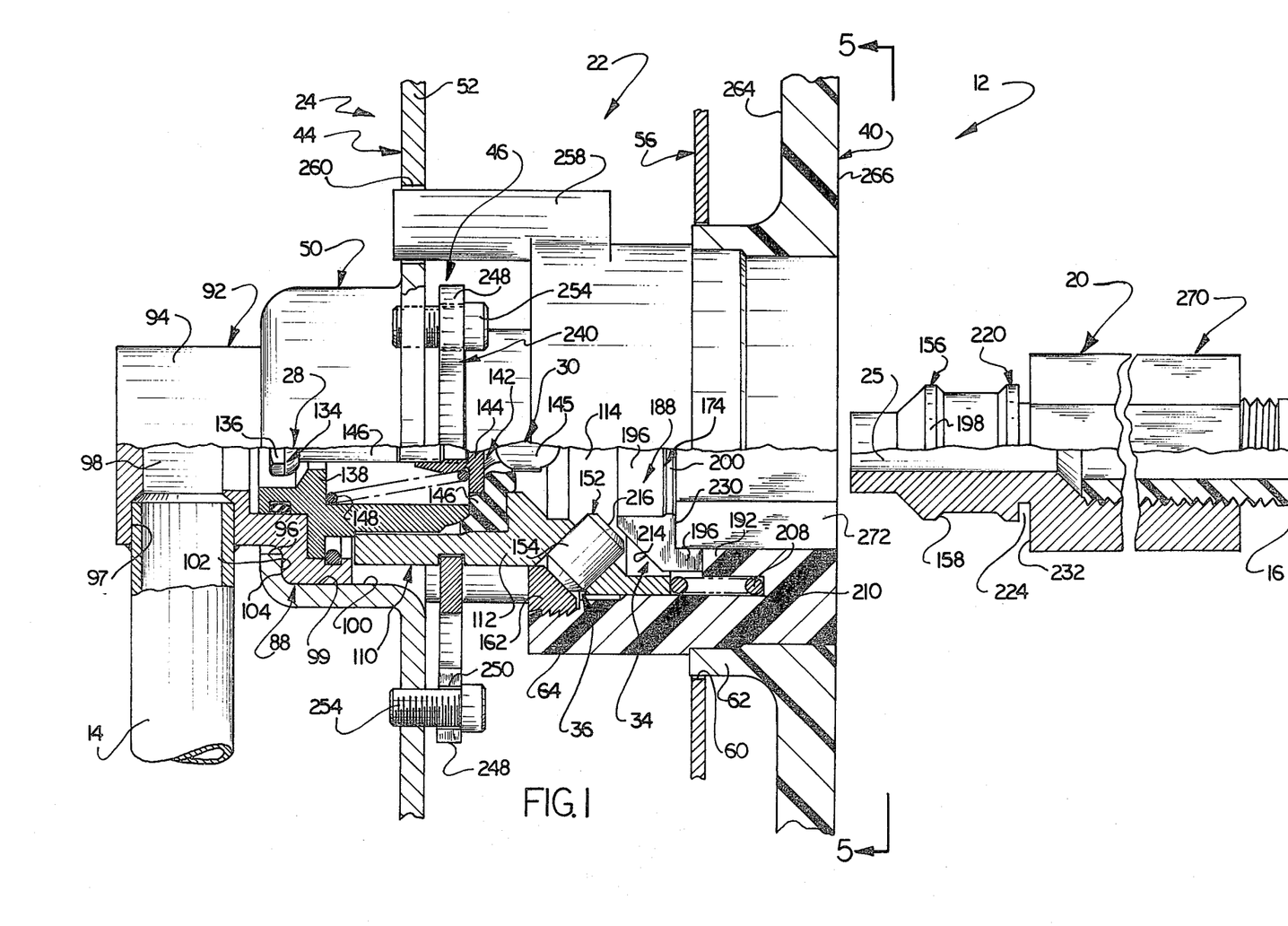
FIG. 1 is an enlarged fragmentary sectional view of a coupling assembly constructed in accordance with the present invention, a plug being shown in a disengaged position spaced from a socket assembly.

A coupling assembly 12 constructed in accordance with the present invention is illustrated in FIG. 1 and is used to connect a pair of conduits 14 and 16 in fluid communication. Although the conduits 14 and 16 could be utilized to conduct many different types of liquids and/or gases, it is contemplated that the conduits will be used to conduct a gas, such as oxygen, to equipment in a hospital. Although it is believed that the coupling assembly 12 will be advantageously used in hospitals and laboratories, it is contemplated that the coupling assembly will be used in other environments.

The coupling assembly 12 includes a plug 20 and a socket assembly 22. The socket assembly 22 is mounted on a wall or other support structure by means of an outlet or receptacle 24. The conduit or tube 14 connects the wall mounted socket assembly 22 with a source of fluid. Although the conduit 16 could have many different constructions, it is contemplated that the conduit 16 may be either a flexible hose or include a rigid member connected to the plug 20 and to a flexible hose. The conduit 16 connects the plug 20 with a suitable piece of equipment which is to use fluid from the conduit 14. Although the conduits 14 and 16 could be associated with many different types of equipment and fluid, it is contemplated that the conduits could be associated with equipment using oxygen in a hospital or laboratory.

Figure 2:
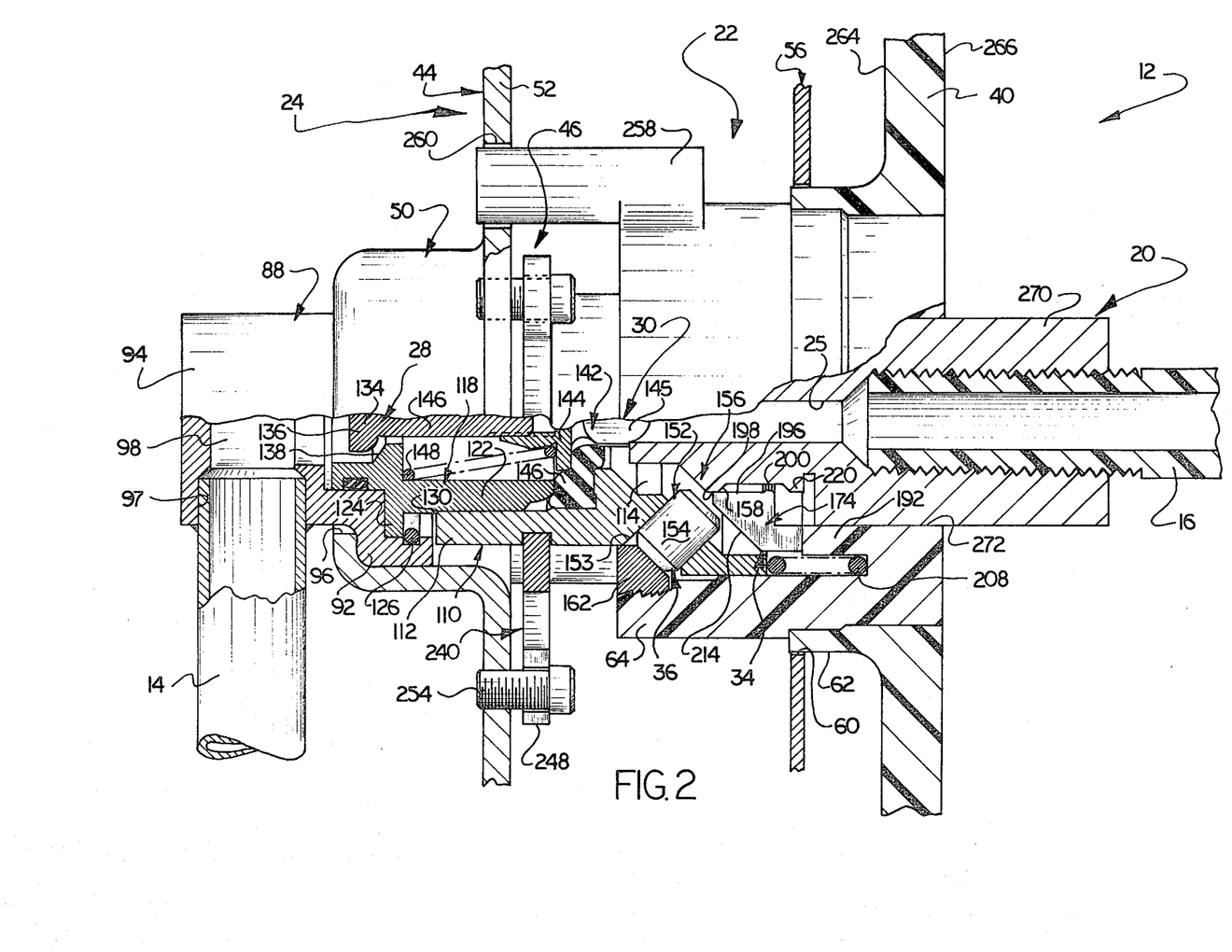
FIG. 2 is a fragmentary sectional view, generally similar to FIG. 1, illustrating the plug in a storage position in which it is telescopically disposed in and supported by the socket assembly.
Figures 3, 4:
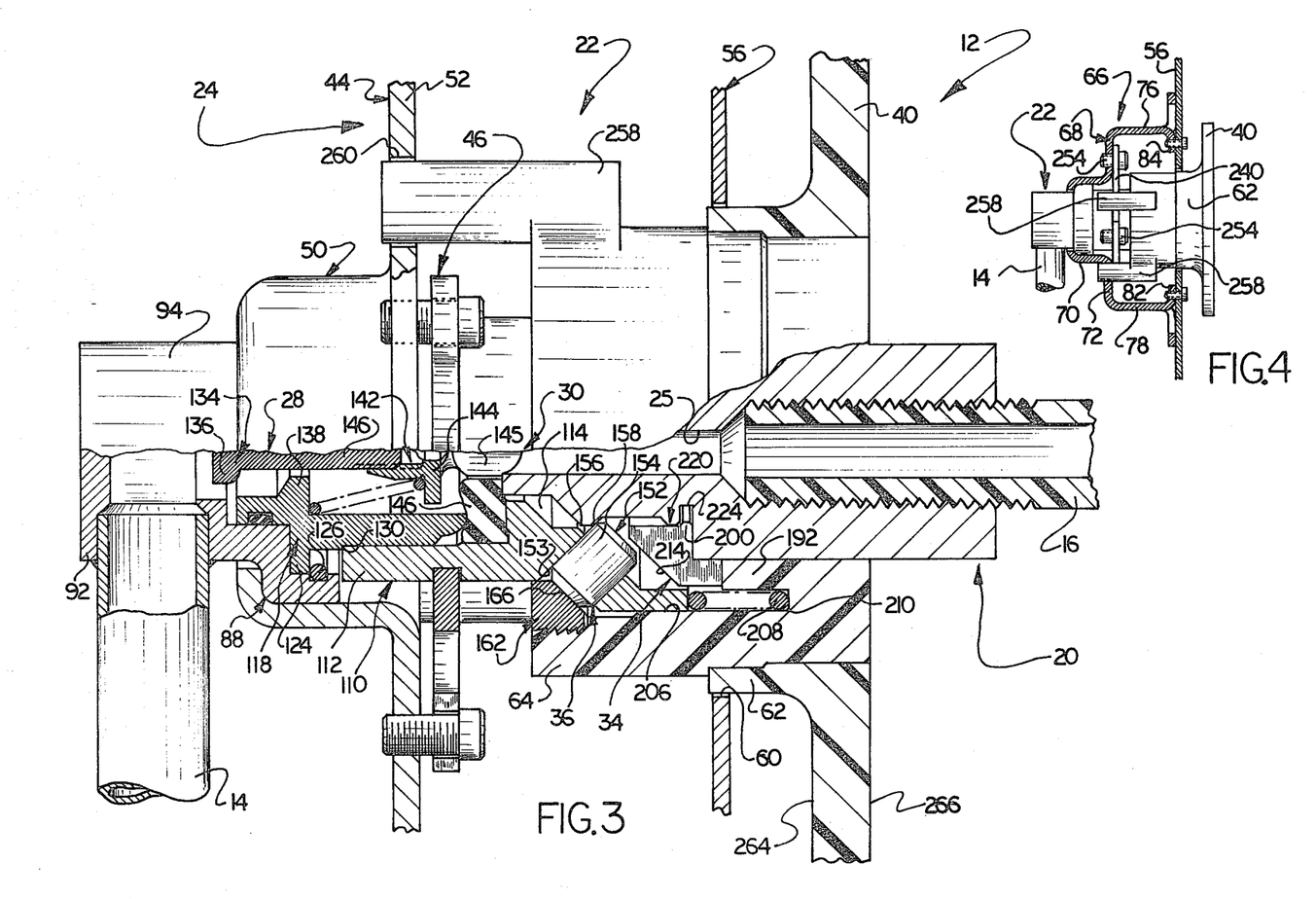
FIG. 3 is a fragmentary sectional view, generally similar to FIGS. 1 and 2, illustrating the plug in an engaged condition in which conduits connected with the plug and socket assembly are connected in fluid communication.
FIG. 4 is a fragmentary sectional view illustrating a second embodiment of a mounting for the socket assembly of FIGS. 1-3.

The plug 20 is axially movable relative to the socket assembly 22 between the disengaged position (FIG. 1), a storage position (FIG. 2) and an engaged position (FIG. 3). When the plug 20 is in the disengaged position of FIG. 1, the plug is separated from the socket assembly 22 and the conduits 14 and 16 are not connected in fluid communication with each other. When the plug is to be moved to the storage position of FIG. 2, it is telescopically inserted into and is supported by the socket assembly 22. At this time, the conduits 14 and 16 are not connected in fluid communication and the plug 20 is supported by the socket assembly. When the conduits 14 and 16 are to be connected in fluid communication with each other, the plug 20 is further telescoped into the socket assembly 22 as it moves to the engaged position shown in FIG. 3. When the plug is in the engaged position of FIG. 3, fluid can flow from the conduit 14 through the socket assembly 22 and a central passage 25 in the plug 20 to the conduit 16.

When the plug 20 is in the disengaged position of FIG. 1, a partially closed valve 28 and a fully closed valve 30 block fluid flow through the socket assembly 22. At this time, the plug 20 can be freely moved with the conduit 16 relative to the fixedly mounted socket assembly 22. If desired, a suitable valve arrangement could be provided in the plug 20 to block fluid flow through the plug when it is in the disengaged position of FIG. 1.

When the plug 20 is in the storage position of FIG. 2, it is disposed in axial alignment with the socket assembly 22 and is releasably held by a gripper assembly 34. The gripper assembly 34 holds the plug 20 against axial movement relative to the socket assembly 22 with a gripping action which can be manually overcome to enable the plug to be either pulled outwardly to the disengaged position or pushed inwardly to the engaged position. When the plug 20 is in the storage position, it is supported in axial alignment with the valves 28 and 30. At this time, the valve 28 is only partially closed while the valve 30 is fully closed to block fluid flow between the conduits 14 and 16.

When the conduits 14 and 16 are to be connected in fluid communication with each other through the plug 20 and socket assembly 22, the plug is pushed axially inwardly from the storage position of FIG. 2 to the engaged position of FIG. 3. As this occurs, the valves 28 and 30 are opened and the plug 20 is engaged by a locking assembly 36 which securely holds the plug in place. The locking assembly 36 firmly holds the plug 20 to prevent it from being manually withdrawn from the socket assembly 22 without first releasing the locking assembly.

When the plug 20 is to be withdrawn from the socket assembly 22, an actuator flange 40 is depressed to operate the locking assembly 36 to release the plug for axially outward movement from the engaged position of FIG. 3 to the storage position of FIG. 2. As the plug 20 moves from the engaged position of FIG. 3 to the storage position of FIG. 2, the valve 30 and closes to again block fluid flow through the socket assembly 22. Of course, the plug 20 can be further withdrawn from the socket assembly 22 and moved from the storage position of FIG. 2 to the disengaged position of FIG. 1 if desired.

Support for Socket Assembly

Although the coupling assembly 12 could be used in many different locations, the socket assembly 22 is fixedly supported in a wall by the receptacle or outlet 24. The receptacle or outlet 24 includes a baseplate or backwall 44 (FIG. 1) which is stamped from sheet metal and is fixedly connected to a building wall or other support structure. Of course, the baseplate or backwall 44 could be formed from something other than sheet metal, for instance, die cast metal or plastic. The socket assembly 22 includes a connector assembly 46 which fixedly connects the socket assembly 22 with the baseplate or backwall 44.

In order to firmly support the socket assembly 22, the baseplate or backwall 44 is provided with a circular cup-shaped section 50 which is integrally formed with and extends toward the left (as viewed in FIG. 1) from a flat main section 52 of the baseplate 44. Although the flat main section 44 could have many different configurations, the main section has a rectangular configuration. A flat cover or faceplate 56 extends across the wall opening in which the outlet or receptacle 24 is disposed.

The faceplate 56 has a rectangular configuration and has a circular central opening 60 through which a cylindrical socket sleeve 64 and a cylindrical mounting section 62 of the flange 40 extend. Although the faceplate 56 could be formed of many different materials, it is preferably metal and is fixedly connected with the backwall 44. The interconnection between the faceplate 56 and backwall 44 is provided by a plurality of flat rectangular sidewalls. The four sidewalls extend perpendicular to and are connected with the backwall 44 and faceplate 56 to form a rectangular outlet box in a known manner.

In the embodiment of the invention illustrated in FIG. 4, the socket assembly 22 is connected with a mounting bracket 66 which is itself mounted in an opening in a wall or in a rectangular box or other support structure. Although the mounting bracket 66 could be formed of many different materials, it is stamped from sheet metal. The mounting bracket 66 has a backwall or baseplate 68 with a circular cup-shaped section 70 which corresponds to the cup-shaped section 50 of the backwall 44 of FIG. 1. A flat annular main section 72 extends radially outwardly from the cup-shaped section 70 and corresponds to the flat main section 52 of the baseplate 44. The outlet bracket 66 also has a pair of side walls 76 and 78 which project axially outwardly from the backwall 72 and form spaced apart segments of a cylinder. The side walls 76 and 78 are provided with flanges 82 and 84 to which the faceplate 56 is connected.

Although two different outlet or receptacle constructions have been described in connection with FIGS. 1–3 and FIG. 4, it is contemplated that other outlet configurations could be utilized if desired. In fact, it is contemplated that the construction of the outlets or receptacles 24 and 66 will be varied in accordance with the particular environment or surroundings in which the coupling assembly 12 is to be used.

When the socket assembly 22 is mounted on different support structures, it is contemplated that the orientation of the rigid metal conduit 14 will vary relative to the socket assembly. In order to accommodate variations in the orientation of the conduit 14 relative to the socket assembly 22, a swivel connection 88 (see FIG. 1) is provided between the conduit 14 and the socket assembly 22. The swivel connection 88 allows the conduit 14 to be rotated about a central axis of the socket assembly 22 and the cup-shaped section 50 of the baseplate 24.

For example, the conduit 14 is pivotal about the central axis of the socket assembly 22 so that it extends upwardly, rather than downwardly as shown in FIG. 1. This is accomplished by rotating a connector member 92 about the central axis of the socket assembly. When the conduit 50 has been moved to the desired angular orientation relative to the socket assembly 22, the connector assembly 46 is tightened to prevent further rotation at the swivel connection 88 to thereby hold the conduit in the desired orientation.

The connector member 92 has a cylindrical section 94 (FIG. 1) which projects through a circular opening 96 in the end wall of the cup-shaped recess 50. The cylindrical section 94 of the connector 92 has a radially extending opening 97 in which an end portion of the rigid conduit or tube 14 is received. The connector member 92 has an axially extending opening 98 which connects the conduit 14 in fluid communication with the inner valve 28.

The connector 92 is rotatably supported by engagement of a cylindrical side surface 99 (FIG. 1) of the connector member with a cylindrical inner surface 100 of the cup-shaped section 50 of the baseplate 44. The connector member 92 is also rotatably supported by engagement of an annular shoulder surface 102 of the connector member with a similar annular end surface 104 of the cup-shaped section 50. By tightening the connector assembly 46, the end surface 102 of the connector member 92 is firmly pressed against the end surface 104 of the cup-shaped section 50 to frictionally hold the connector member 94 and conduit 14 against rotational movement relative to the outlet 24 and associated support structure.

Socket Assembly: Housing

The socket assembly 22 includes a housing 110 (see FIG. 2) having a main or body section 112 which is coaxial with the connector member 92 of the swivel connection 88. The hollow metal main housing section 112 has circular internal surfaces which define a cavity 114 into which the plug 20 is telescopically received. The connector assembly 46 connects the main section 112 of the housing assembly 110 with the backwall or baseplate 44.

The housing 110 also includes a metal valve housing section 118 (FIG. 2) which is coaxial with the connector member 92 and main housing section 112. The valve housing section 118 has a cylindrical side wall 122 which is telescopically received in the main section 112 of the housing assembly 110. The valve housing section 118 also has an annular flange 124 which is held in a recess formed in the metal connector member 92 by a circular snap ring 126.

The main housing section 112 abuts an annular shoulder 130 (FIG. 2) formed in the valve housing section 118. When the connector assembly 46 is tightened, the main housing section 112 firmly presses the valve housing section 118 against the connector member 92 and the bottom of the cup-shaped section 50 of the baseplate 44. Frictional engagement between the valve housing section 118 and connector member 92 hold them against rotation relative to each other and against rotation relative to the main housing section 112 and baseplate 44 when the connector assembly 46 is tightened.

Socket Assembly: Valves

The coaxial valves 28 and 30 include a metal-to-metal inner valve 28 and a metal-to-polymeric outer valve 30. Thus, the inner valve 28 has a circular metal valve head 134 (FIG. 2) with a flange 136 which is engageable with an annular metal valve seat 138 formed in the valve housing section 118.

the outer valve 30 includes a metal valve member 142 having an annular shoulder 144 which sealingly engages a polymeric ring 146 when the valve 30 is in the closed condition of FIG. 2. The valve member 142 has a leading end or nose section 145 which guides movement of the valve member 142 between the closed position of FIG. 2 and the open position of FIG. 3. The nose or leading end section 145 of the valve member 142 is flattened so that fluid can flow around the end section of the valve when it is in the open position shown in FIG. 3. The manner in which the valve member 142 cooperates with the annular polymeric valve washer 146 is well known and is generally the same as is disclosed in U.S. Patent No. 2,805,089.

The valves 28 and 30 are simultaneously operated only by the plug 30. Thus, the valve 28 is operated from the partially closed condition and the valve 30 is operated from the fully closed condition of FIG. 2 to the open position of FIG. 3 when the plug 20 is moved from the storage position of FIG. 2 to the engaged position of FIG. 3. Similarly, the valves 28 and 30 are simultaneously moved toward their closed conditions when the plug is moved axially outwardly from the engaged position of FIG. 3 to the storage position of FIG. 2. To provide for simultaneous actuation of the valves 28 and 30, the valve member 142 is connected with the head end section 134 of the valve 28 by a cylindrical valve stem 146. Therefore, when the leading end of the plug 20 moves the valve member 142 inwardly from the closed position of FIG. 2 to the open position of FIG. 3, the valves 28 and 30 are fully opened. When the plug 20 is withdrawn to the storage position of FIG. 2, the coil spring 148 is effective to fully close the valve 30 and to partially close the valve 28. At this time the valve 30 blocks fluid flow through the socket assembly 22.

Socket Assembly: Locking Assembly

When the plug 20 is in the engaged position of FIG. 3, the plug is firmly held against axial movement by the locking assembly 36. The locking assembly 36 includes a circular array of cylindrical locking elements 152. Although only one of the metal locking elements 152 is shown in FIGS. 1-3, there are a plurality of locking elements 152 disposed in a circular array in cylindrical openings 153 formed in the side wall of the main housing section 112. Each of the locking elements 152 has a cylindrical side surface 154.

The circular array of locking elements 152 is arranged in a coaxial relationship with the valves 28 and 30, the main housing section 112 and the cavity 114 in which the metal plug 20 is telescopically received. In one specific preferred embodiment of the invention, three locking elements 152 are disposed in a circular array in three equally spaced openings formed in the circumference of the main housing section 112. Of course, any desired number of locking elements 152 could be provided in the circular array.

Each of the locking elements 152 engages an annular ring 156 (FIG. 1) formed on the leading end portion of the plug 20 when the plug is in the engaged position (FIG. 3). Thus, the annular metal ring 156 on the leading end portion of the plug 20 has an axially and radially outwardly sloping side surface 158 (FIG. 1) which is engaged by the cylindrical outer side surface of the metal locking elements 154 when the plug 20 is in the engaged position (FIG. 3). Abutting engagement between the annular side surface 158 of the plug ring 156 and the locking elements 154 firmly holds the plug 20 against being pulled out of the socket cavity 114 when the plug is in the engaged position.

The locking elements 152 are held in the locking position shown in FIG. 3 by a metal retainer ring 162. The retainer ring 162 is connected with a cylindrical sleeve 64 which is formed of a suitable polymeric material. When the sleeve 64 is in the extended position shown in FIG. 3, a sloping annular surface 166 of the circular metal retainer ring 162 abuts the ends of the cylindrical metal locking elements 152 to firmly hold them in engagement with the ring 156 on the metal plug 20. When the sleeve 64 is moved axially inwardly to a retracted position (FIG. 7), the locking elements 154 are free to move axially outwardly to their release positions. The plug 20 can then be withdrawn from the socket cavity 114.

When the locking elements 152 are in the engaged or locking position shown in FIG. 3, they cooperate with the ring 156 on the plug 20 to hold the plug against axial movement. Therefore, the plug 20 cannot be manually withdrawn from the socket assembly 22. When the locking elements 152 have moved outwardly to their released positions (FIG. 7), the locking elements are disposed radially outwardly of the ring 156. At this time, the locking elements are ineffective to retard axial movement of the plug from the socket assembly 22.

The manner in which the locking elements 152 cooperate with the plug 20 is well known and is generally the same as is disclosed in U.S. Pat. Nos. 2,092,116 and 2,433,119. It should be understood that although cylindrical locking elements 154 are preferred, it is contemplated that other types of locking elements could be used, for example, retaining balls, rings or slots could be used if desired. In addition, it should be understood that although the retainer ring 162 is formed separately from the sleeve 64, the retainer ring could be formed as an integral part of the sleeve and could have an axially extending retainer surface 166 if desired. If this was done, the inner section of the sleeve 64 could have a separate section on which the gripper assembly 34 would be disposed in order to facilitate construction of the socket assembly 22.

Socket Assembly: Gripper Assembly

In accordance with one of the features of the present invention, a gripper assembly 34 is provided to hold the plug 20 in a storage position in which the conduits 14 and 16 are not connected in fluid communication and in which the plug is axially aligned with and telescopically disposed in the socket assembly 22 (see FIG. 2). When the plug 20 is in the storage position, the valve 30 is closed. The plug 20 is engaged by the gripper assembly 34 and by an inner side surface of the axially movable sleeve 64. The gripper assembly 34 and sleeve 64 support the plug 20 in axial alignment with the valves 28 and 30 and with the locking assembly 36.

When the plug 20 is in the storage position of FIG. 2, the longitudinal central axis of the plug and passage 25 are aligned with the longitudinal central axis of the socket assembly 22. Therefore the plug 20 can be easily moved from the storage position to the engaged position (FIG. 3) with a minimum of difficulty. When the coupling assembly 12 is used in association with a fluid from which material is to be removed and/or added, it is contemplated that the container or flask will be connected with the plug 20 and supported by the socket assembly 22 when the plug is in the storage position. By providing the storage position for the plug 20, equipment to which oxygen or fluid is to be conducted can be quickly activated by merely pushing the plug into the socket.

Figure 7:
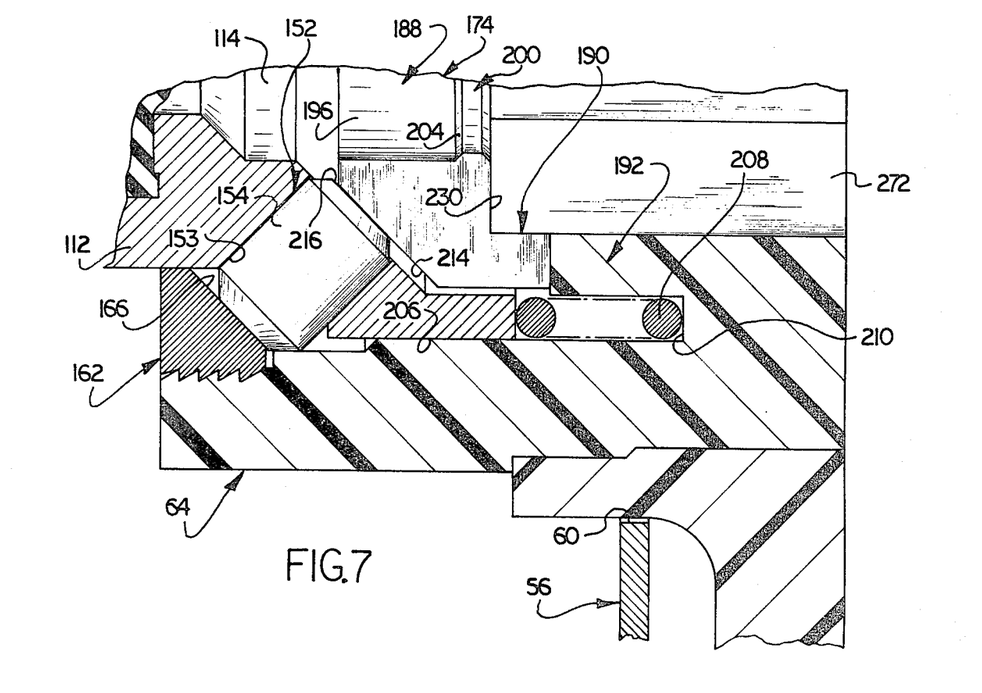
FIG. 7 is an enlarged fragmentary sectional view illustrating the relationship between a detent member and a locking element when the locking element is in a released position and the sleeve of the coupling assembly has been retracted.

The gripper assembly 34 includes a plurality of resilient cantilevered fingers or detents 174, 176, 178, 180, 182 and 184 (see FIGS. 5 and 6) integrally formed with the sleeve 64 of a suitable polymeric material. The detents 174-184 are disposed in a circular array on the inside of the sleeve 64 in axial alignment with the locking assembly 36 (FIG. 2) and main housing section 112. Each of the resiliently deflectable gripper fingers 174-184 includes an outer end portion 188 (see FIG. 7) which engages the plug 20 and a base section 190 which extends outwardly from a collar 192 (FIG. 7).

The outer end portion 188 of the detent finger 174 has a surface 196 (FIGS. 2 and 7) which forms a portion of an a cylinder and abuts a cylindrical outer side surface 198 (FIG. 1) of the ring 156 when the plug 20 is in the storage position of FIG. 2. The arcuate inwardly facing side surface 196 on the detent finger 174 has the same radius of curvature as the cylindrical outer side surface 198 of the ring 156 on the plug 20. This results in firm supporting engagement between the detent 174 and the plug 20 when the plug is in the storage position of FIG. 2.

In order to prevent accidental withdrawal of the plug 20 from the socket assembly 22 when the plug is in the storage position, the detent finger 174 is provided with an arcuate ridge or protuberance 200. The ridge 200 projects radially inwardly from an axially outer end portion of the cylindrical side surface 196. The center of curvature of the ridge 200 is the same as the center of curvature of the arcuate side surface 196.

If the plug 20 is gently pulled in an axially outward direction when the plug is in the storage position of FIG. 2, the sloping side surface 158 of the annular ring 156 moves into abutting engagement with the rim 200 to hold the plug in the socket assembly 22. The gripping action between the detent 174 and the ring 156 is sufficient to prevent the plug 20 from being inadvertently withdrawn from the socket assembly 22 under the influence of axially outwardly directed forces which may under normal circumstances be applied to the plug when it is not intended to withdraw the plug from the socket assembly.

When the plug 20 is to be withdrawn from the socket assembly and moved from the storage position of FIG. 2 to the disengaged position of FIG. 1, a relatively large axially outwardly directed force is applied to the plug. The axially and radially outwardly sloping side surface 158 of the ring 156 then applies a camming force against a sloping side surface 204 (see FIG. 7) of the detent finger 174. This force resiliently deflects the detent finger 174 radially outwardly to release the plug for withdrawal from the socket assembly 22. The other detent fingers 176-184 are resiliently cammed outwardly in the same manner as the detent finger 174.

The gripping action provided by the detent fingers 174-184 of the gripper assembly 34 is sufficient to hold the plug 20 in the socket assembly 22 against the influence of commonly encountered forces which are not intended to withdraw the plug 20 from the socket assembly. However, when a manual force is applied to the plug to intentionally withdraw the plug from the socket assembly 22, this force is sufficient to cam the detent fingers 174-184 radially outwardly to enable the plug to be withdrawn from the socket assembly. Thus, the gripping action provided by the gripper assembly 34 is sufficient to prevent inadvertent withdrawal of the plug 20 from the socket assembly 22 while enabling the plug 20 to be intentionally withdrawn from the socket assembly. Although only the construction of the detent finger 174 has been extensively described herein, it should be understood that the detent fingers 176, 178, 180, 182 and 184 have the same construction and cooperate with the plug 20 in the same manner as does the detent finger 174.

When the plug 20 is to be moved from the storage position of FIG. 2 to the engaged position of FIG. 3, the plug 20 is moved axially toward the left (as viewed in FIG. 2) relative to the housing 110. The frustoconical leading side surface of the ring 156 on the plug 20 applies force against the locking elements 152 to move them outwardly of the housing 110. This applies an axial force component to the retainer ring 162 to slide the sleeve 64 along a cylindrical outer side surface 206 of the housing 112 (FIG. 7) against the influence of a coil spring 208. As this occurs, the sleeve 64 moves inwardly from the extended position shown in FIG. 2 to the retracted position shown in FIG. 7 and the locking elements 152 move to their release positions. If desired, an axially inward force could be applied to the collar 40 to move the sleeve 64 inwardly with the plug 20.

As the sleeve 64 is retracted, the outer ends of the locking elements 152 apply a force against the inwardly facing surface 166 of the retainer ring 162. At the same time, a radially and axially inwardly sloping outer side surface 214 (see FIG. 7) of the gripper finger 174 moves into abutting engagement with the inner end surface 216 of a locking element 152. This positively positions the locking element 152 in the release or disengaged position of FIG. 7. Although only the side surface 214 on the detent finger 174 is shown in FIG. 7, it should be understood that the detent fingers 176-184 are provided with similar side surfaces which engage the other locking elements.

After the sleeve 64 has been retracted and the locking element 152 have been moved to their released positions, the plug 20 is inserted still further into the socket assembly 22. As this occurs, the axially outer ring 156

(FIG. 1) on the plug 20 moves inwardly past the locking elements 152 which are held in a disengaged or retracted position by the detent fingers 174-184 (FIG. 7). At the same time, an annular axially inner ring 220 (FIGS. 1 and 3) on the plug 20 engages the arcuate ridges 200 on the detents 174-184 (FIG. 7) and cams the detents radially outwardly. The plug ring 220 then moves past the detent finger ridges 200. The resilient detents 174-184 then move inwardly to position the ridges 200 in an annular recess 224 in the plug 20.

The detent fingers 174-184 are provided with radially extending shoulders 230 (see FIG. 7). The shoulders 230 abuttingly engage a radially extending shoulder surface 232 (see FIG. 1) on the plug 20. Engagement of the shoulder surface 232 on the plug 20 by the shoulders 230 on the detent fingers 174-184 limits the extent of axially inward movement of the plug 20. It should be noted that when the radially extending shoulder 232 on the plug 20 engages the shoulders 230 on the detent fingers 174-184, the plug is disposed axially inwardly of the position shown in FIG. 3. At this time, the outer ring 156 on the end portion of the plug is spaced from the locking elements 152 and the valve 30 is somewhat past the fully open position of FIG. 3.

The sleeve 64 is then released for axially outward movement under the influence of the spring 208. The radially extending shoulders 230 on the detent fingers 174-184 pull the plug axially outwardly. As the plug 20 moves outwardly to the position shown in FIG. 3, the outer ring 156 on the plug engages the locking elements 152.

When the plug 20 is in the engaged position shown in FIG. 3, the detent fingers 174-184 are disposed in engagement with the axially inner ring 220 on the plug and the axially outer ring 156 on the plug is disposed in engagement with the locking elements 152. The detents 174-184 perform the functions of partially supporting the plug 20 in the storage position of FIG. 2, preventing the plug 20 from being inadvertently withdrawn from the socket assembly when it is in the storage position, and positively positioning the locking elements 152 in the release position of FIG. 7 when the sleeve 64 is retracted.

When the plug 20 is to be withdrawn from the engaged position of FIG. 3 to either the storage position of FIG. 2 or the disengaged position of FIG. 1, the sleeve 64 is retracted by manually depressing the actuator flange 40. This moves the retainer ring 162 axially inwardly away from the locking elements 152. At the same time, the surfaces 214 on the detent fingers 174-184 move into engagement with the locking elements 152 to positively move them to their release positions (FIG. 7). The plug 20 is then partially or fully withdrawn from the socket assembly. It should be noted that as the plug 20 is withdrawn from the socket assembly, the valve 30 close to prevent the escape of pressurized fluid from the conduit 14.

Socket Assembly: Mounting

Figures 8, 9:
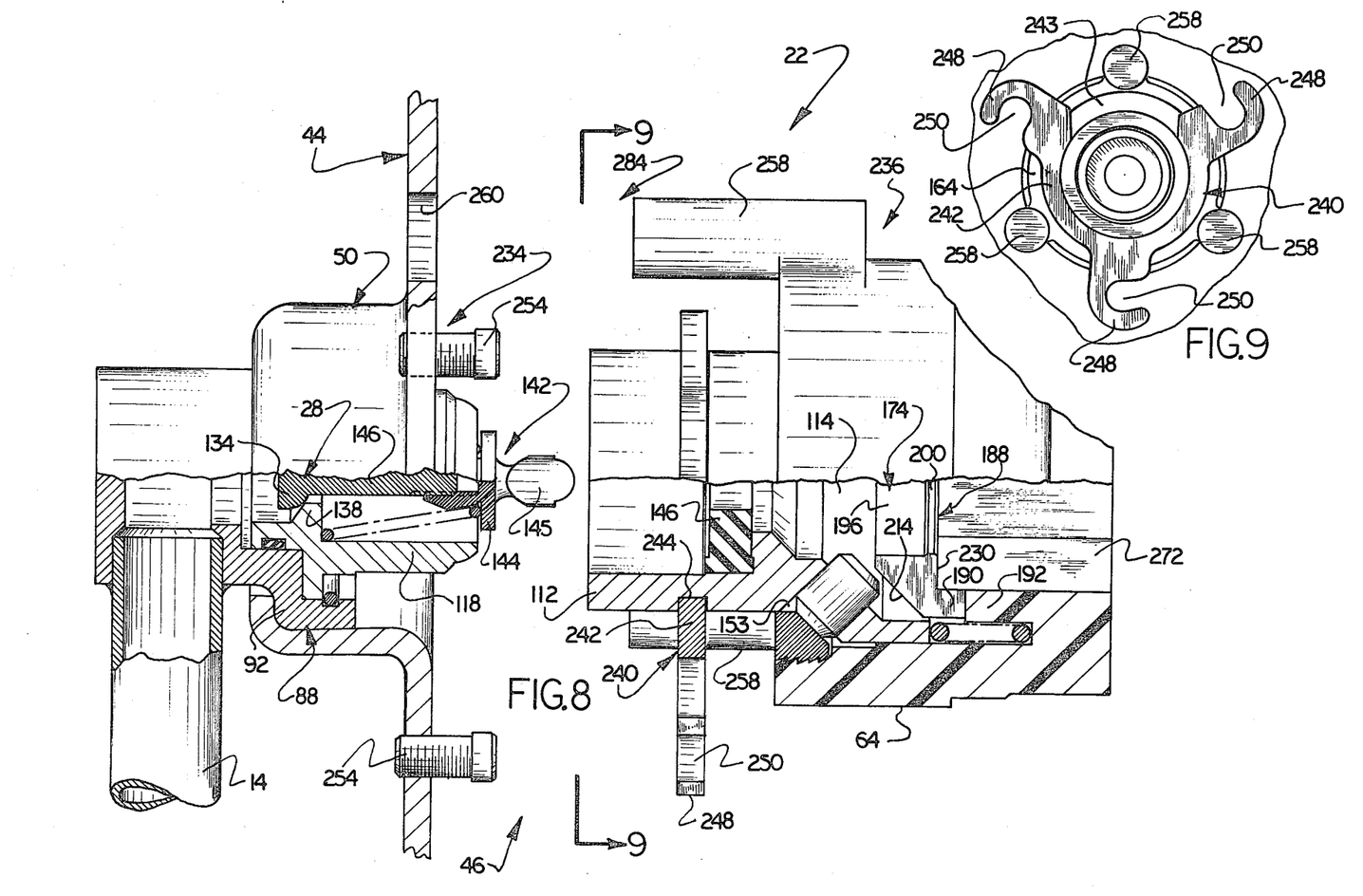
FIG. 8 is a fragmentary sectional view, generally similar to FIGS. 1-3, illustrating the socket assembly in a partially assembled condition.
FIG. 9 is a plan view, taken on a reduced scale along the line 9—9 of FIG. 8, illustrating the construction of a member for mounting an outer portion of the socket assembly on a baseplate or backwall.

In order to facilitate mounting of the socket assembly in the wall or other support structure, the socket assembly is separable into two sections 234 and 236 (see FIG. 8). The section 234 is received in the cup-shaped portion 50 of the baseplate 44 and includes the connector member 92 and the valve housing section 118. The inner valve 28 is disposed in the housing section 118 along with the valve member 142 of the outer valve 30. Prior to mounting of the outer section 236, the inner valve 28 is fully closed. Once these components have been mounted on the baseplate 24 in the manner shown in FIG. 8, the outer section 236 of the socket assembly is connected with the baseplate by the connector assembly 46.

The connector assembly 46 includes a mounting member or spider 240 having an annular main body section 242. The annular body section 242 has an opening 243 which is slightly smaller than the diameter of the circular central opening in the body section to enable the body section to be snapped into an annular groove 244 (FIG. 8) in the main section 112 of the housing 110. The spider 240 is freely rotatable in the groove 244. However, the opening 243 is slightly smaller than the inside diameter of the groove 244 so that the spider remains in place on the housing section 112 while being rotated relative to the housing section.

The metal spider or mounting member 240 is provided with a plurality of radially outwardly projecting legs 248 having recesses 250 (see FIG. 9). The recesses 250 are engageable with screws 254 which extend outwardly from the baseplate 24 (see FIGS. 6 and 8).

When the axially outer socket section 236 of the socket assembly 22 is to be connected with the inner socket section 234, the main housing section 112 is telescoped over the valve housing section 118. A plurality of interlock elements or legs 258 extend axially outwardly from one end of a cylindrical sidewall of the sleeve 64 (see FIGS. 8 and 9). The legs 258 are located in axial alignment with a plurality of interlock elements or openings 260 in the baseplate 24. As the straight cylindrical legs 258 move into the circular openings 260, the mounting member or spider 240 moves toward the baseplate 24 with the legs 248 offset from the screws 254.

The spider 240 is then rotated relative to the main housing section 112. This moves the recesses 250 in the spider legs 248 into engagement with the screws 254. The screws 254 are then tightened to hold the spider 240 in juxtaposition with and against rotation relative to the baseplate 44. Tightening the screws 254 presses the outer socket section 236 into firm engagement with the inner socket section 234. The inner socket section 234 is pressed against the inner surface of the cup-shaped section 50 to frictionally hold the inner connector member 92, valve housing section 118 and main housing section 112 against movement relative to the baseplate 44. The legs 258 on the sleeve 64 cooperate with the baseplate 44 to hold the sleeve 64 against rotational movement while allowing the sleeve to move axially relative to the baseplate.

As the outer socket section 236 is mounted on the inner socket section 234, the valve member 142 is pressed firmly against the valve seat 146 and the axially inner valve member 134 moves slightly away from the valve seat 138. This enables the spring 208 to maintain the valve member 142 in tight sealing engagement with the resilient valve seat 146. If it is subsequently necessary to replace the valve seat 146, the inner valve member 134 sealingly engages the valve seat 138 (FIG. 8) and prevents leakage of fluid from the conduit 14 when the outer section 236 of the socket assembly is disconnected from the inner section 234.

Once the socket sections 234 and 236 have been interconnected in the manner previously described, the faceplate 56 is mounted on the outlet box with the socket sleeve 64 extending through the circular opening 60 in the faceplate. The actuator flange or collar 40 is then positioned on the sleeve 64 with the mounting section 62 extending into the opening 60 in the manner shown in FIGS. 1–3. When the actuator flange 40 has been positioned on the sleeve, flat annular inner and outer side surfaces 264 and 266 of the flange 40 extend parallel to the flat side surfaces of the faceplate 56 and to the flat side surface of the main section 52 of the baseplate 44.

Fluid Identification

It is contemplated that the coupling assembly 12 will advantageously be used in hospitals, laboratories and other environments where various different fluids, such as oxygen, nitrus oxide, and air, are to be supplied to various pieces of equipment. When the coupling assembly 12 is to be used in such an environment, it is extremely important that the correct fluid be conducted to each piece of equipment. Thus it is important that a plug intended to conduct one type of fluid to a piece of equipment is not inserted into a socket assembly connected in fluid communication with a source of a different type of fluid. When a socket assembly 22 is installed, it is very important that an outer socket section 236 be connected with an inner socket section 234 which is connected in fluid communication with an intended source of fluid.

In order to prevent the inadvertent insertion of a plug intended to be connected with one type of gas into a socket assembly connected with a different type of gas, the plug 20 is provided with a shank or body 270 (see FIG. 1) having a noncircular cross sectional configuration which corresponds to the particular type of gas to be conducted. The sleeve 64 is provided with a cavity 272 (FIG. 1) having a configuration corresponding to the configuration of the shank of the particular type of plug to be inserted into the socket assembly 22 (see FIGS. 1, 5 and 6). In the specific preferred embodiment of the invention illustrated in FIGS. 1, 5 and 6, the plug 20 is associated with oxygen gas and is provided with a hexagonal body or shank section 270. The shank 270 is received in a hexagonal cavity or recess 272 in the sleeve 64. It is contemplated that a plug and sleeve cavity associated with a different type of gas would have a different configuration. For example, the plug could be provided with a square shank 270 and be received in a square recess 272 in a sleeve.

Figures 5, 6:
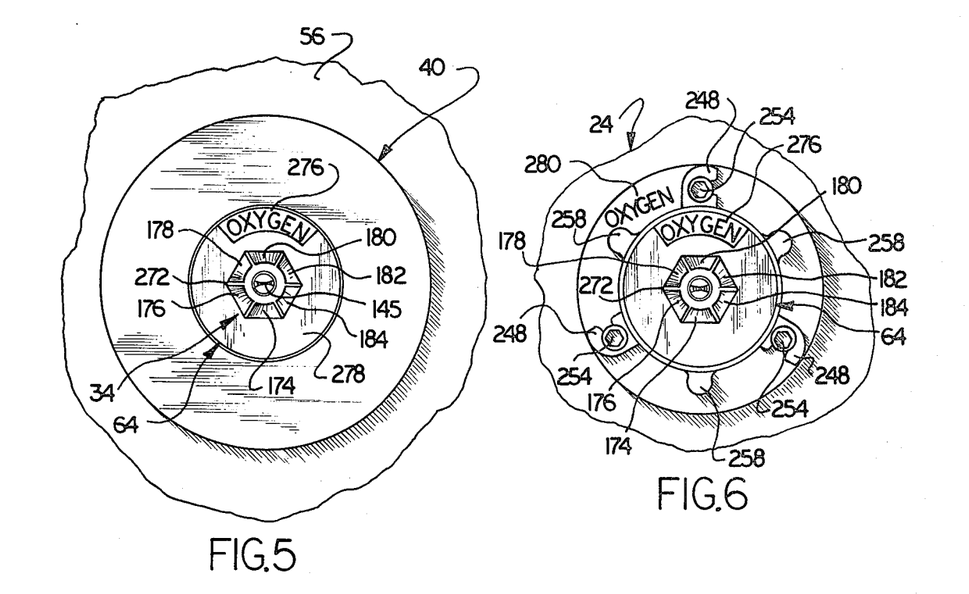
FIG. 5 is a fragmentary plan view, taken on a reduced scale along the line 5—5 of FIG. 1, illustrating the relationship between a sleeve of the socket assembly and an actuator flange.
FIG. 6 is a fragmentary plan view, generally similar to FIG. 5, with the actuator flange and a faceplate removed.

To further prevent the inadvertent insertion of the wrong plug in a socket assembly 22, the socket assembly is provided with indicia 276 (see FIG. 5) which identifies the type of fluid to which the socket assembly 22 is connected. It should be noted that the indicia 276 is disposed on an axially outer end face or surface 278 of the sleeve 64. Since the cylindrical legs 258 extend into the circular openings 260 in the stationary baseplate 44, the sleeve 64 is held against rotation and the indicia 276 remains in a desired orientation, that is upwardly as shown in FIG. 5.

It is very important that when the socket assembly is initially assembled correctly. This requires that the outer socket section 236 be connected with an inner socket section 234 so that the indicia 276 on the sleeve 64 correctly indicates the type of fluid which is to be conducted through the socket assembly. Therefore, indicia 280 (see FIG. 6) is provided on the baseplate 44 to clearly identify the fluid or gas source to which the conduit 14 and inner socket section 234 are connected. Similar indicia 276 is provided on the outer portion 236 of the socket assembly so that the correct outer portion 236 of the socket assembly is connected with the inner portion 234 of the socket assembly and the conduit 14. In the illustrated embodiment of the invention oxygen gas is to be conducted through the socket assembly 22, it is contemplated that the socket assembly could be utilized in association with other types of gases or liquids. If this was done, the indicia 276 and 280 would designate the fluid which is to be conducted through the socket assembly 22.

In order to prevent the connection of an outer socket section 236 associated with indicia 276 for one type of fluid with an inner socket section 234 associated with indicia 280 for another type of fluid, an interlock arrangement 284 (FIG. 8) is provided between the inner and outer socket sections 234 and 236. The interlock arrangement 284 is formed by the cooperation between the legs 258 on the sleeve 64 of the outer socket section 236 and the openings 260 on the baseplate 44 connected with the inner socket section 234. The configuration and the spacing of the openings 260 is such that only the legs 258 of an outer socket section 236 associated with the same type of fluid as the inner socket section can be inserted into the openings. Thus in the specific embodiment of the invention shown in FIGS. 8 and 9, the legs 258 have a cylindrical configuration and are equally spaced about the circumference of the sleeve 64. The openings 260 in the baseplate 44 have a circular configuration and are equally spaced apart in a circular array having the same diameter as the circular array of legs 258 extending from the socket sleeve 64. Therefore, the legs 258 can be readily inserted into the openings 260.

It is contemplated that the socket legs or interlock elements 258 for different types of fluid will have different spacings and/or configurations. Thus in the specific embodiment of the invention illustrated in the drawings, the equally spaced legs 258 are associated with the gas oxygen. It is contemplated that unequally spaced legs 258 will be provided on the sleeves 64 of outer socket sections 236 having indicia 276 indicating a different fluid, for example, the gas nitrous oxide. The baseplate 44 would then have indicia 280 indicating the gas nitrous oxide and interlock openings 260 having the same spacing as the interlock legs 258 on the sleeve 64. Therefore, an outer socket section 236 associated with the gas nitrous oxide by the indicia 276 can only be connected with an inner socket section 234 which is associated with the gas nitrous oxide by the indicia 280. By varying the spacing of the interlock legs 258 and openings 260 and the cross-sectional configuration of the legs and openings, a very large number of interlock combinations can be formed to be certain that outer socket sections 236 associated with a particular fluid are only connected with inner socket sections 234 associated with the same fluid.

SUMMARY

In view of the foregoing, it is apparent that the present invention provides coupling assembly 12 which is used to connect a pair of conduits 14 and 16 in fluid communication. The coupling assembly 12 includes a socket assembly 22 which is connected with the conduit 14 and telescopically receives a plug 20. The plug 20 is movable from a disengaged position (FIG. 1) spaced from the socket assembly 22 to a storage position (FIG. 2) in which the plug 20 is telescopically received in and supported by the socket assembly 22. The plug 20 can be pressed further into the socket assembly (FIG. 3) to connect two conduits 14 and 16 in fluid communication.

In order to prevent the plug 20 from being jerked out of the socket assembly 22 with a resulting disconnecting of the conduits, when the coupling assembly is connected the plug is securely held in the engaged position by a plurality of locking elements 152. However, it is contemplated that the plug will be manually movable from the storage position (FIG. 2) either inwardly to the engaged position (FIG. 3) or outwardly to the disengaged position (FIG. 1). In order to prevent inadvertent movement of the plug 20 from the storage position, detents 174-184 are provided to hold the plug in the storage position with a gripping action which can be manually overcome.

The locking elements 152 in the socket assembly 22 are held in place when the plug 20 is in the engaged position (FIG. 3) by a retainer surface 166 which is connected with an axially movable sleeve 64. The axially movable sleeve 64 extends through an opening 60 in a faceplate 56 and is held against rotation by the legs 258 which extend between the sleeve 64 and a base or mounting plate 44. Since the sleeve 64 is held against rotational movement, indicia 276 identifying a gas to be conducted through the coupling assembly is disposed on the portion of the sleeve which projects outwardly from the faceplate 56.

Mounting of the coupling assembly on a wall or other support structure is facilitated by providing a receptacle or outlet 24 in which the socket assembly 22 is received. In order to enable the orientation of a conduit 14 connected with the wall mounted socket assembly 22 to be varied, the socket assembly includes a swivel connector 88 which is freely rotatable relative to a backwall or baseplate 44 of a mounting for the socket assembly. Installing the socket assembly in a wall or other support structure is facilitated by mounting an inner portion 234 of the socket assembly 22 on the baseplate 44. An outer portion 236 of the socket assembly 22 is subsequently connected with the baseplate.

In order to be certain that the desired gas or other fluid is conducted through the coupling assembly, the baseplate 44 is provided with indicia 280 to identify the fluid. Similar indicia 276 is provided on the sleeve at a location disposed outside of the faceplate 56. The plug 20 which is to be telescopically received in the socket assembly has a noncircular shank 270 with a configuration which corresponds to the configuration of an opening 272 into which the plug is telescopically inserted. In order to maintain the indicia 276 on the sleeve 64 in a desired orientation relative to a wall or other support structure, the sleeve is held against rotation by the legs 258 which extend between the sleeve and the baseplate. Installations of the wrong outer socket section 236 with a wall mounted inner socket section 234 is prevented by the interlock arrangement 284.

Having described specific preferred embodiments of the invention, the following is claimed:

1. A coupling assembly for use in connecting a pair of conduits in fluid communication, said coupling assembly comprising a plug adapted to be connected with one of the conduits, said plug having a central axis which extends along a fluid flow path through said plug, and socket means adapted to be connected with the other conduit and adapted to telescopically receive said plug, said plug being axially movable from a disengaged position spaced from said socket means to a storage position in which said plug is supported by said socket means and is telescopically disposed in said socket means to a first extent and being axially movable from the storage position to an engaged position in which said plug is telescopically disposed in said socket means to a second extent which is greater than the first extent and in which the conduits are connected in fluid communication through said plug and said socket means, said socket means including locking means which is operable between a locking condition holding said plug against axial movement from the engaged position toward the storage position and a release condition in which said locking means is ineffective to hold said plug against axial movement, said locking means including a circular array of locking elements and retainer means for holding said locking elements in engagement with said plug when said locking means is in the locking condition and said plug is in the engaged position with a holding action which is sufficient to prevent said plug from being manually moved from the engaged position to the storage position, said retainer means being ineffective to hold said locking elements in engagement with said plug when said locking means is in the release condition to enable said plug to be moved from the engaged position to the storage position, said socket means further including gripper means for holding said plug against axial movement from the storage position to the disengaged position with a gripping action which can be overcome by manually pulling said plug away from said socket means, said gripper means including a circular array of detents which is disposed in a coaxial relationship with said circular array of locking elements and is spaced from said circular array of locking elements when said locking means is in the engaged condition.

2. A coupling assembly as set forth in claim 1 wherein said detents include surface means for engaging said locking elements and moving said locking elements to effect operation of said locking means from the locking condition to the release condition.

3. A coupling assembly as set forth in claim 1 wherein each of said locking elements includes first and second side surfaces, said retainer means being disposed in abutting engagement with the first side surfaces of said locking elements when said locking means is in the locking condition, at least some of said detents being engageable with the second side surfaces of said locking elements when said locking means is in the release condition.

4. A coupling assembly as set forth in claim 1 wherein a leading end portion of said plug includes an annular ring, each of said locking elements being disposed in abutting engagement with said annular ring on the leading end portion of said plug when said locking means is in the locking condition and said plug is in the engaged position, said detents being disposed in abutting engagement with said annular ring on the leading end portion of said plug when said plug is in the storage position.

5. A coupling assembly as set forth in claim 1 wherein said socket means includes a housing having surface means for at least partially defining a chamber in which said plug is telescopically received when said plug is in the engaged position, said coupling assembly further including a baseplate and means for connecting said housing with said baseplate and for holding said housing against movement relative to said baseplate, said socket means including a rotatable connector member adapted to be connected to said other conduit, said connector member being rotatable relative to said baseplate and said housing to enable the angular orientation of said other conduit to be varied relative to said baseplate and housing.

6. A coupling assembly as set forth in claim 5 wherein said baseplate includes a flat main section and a generally cup-shaped section which projects from said main section, said connector member being at least partially disposed in said cup-shaped section.

7. A coupling assembly as set forth in claim 5 wherein said means for connecting said housing with said baseplate includes a mounting member having a central section which circumscribes said housing and a plurality of leg sections which extend outwardly from said central section and are disposed in juxtaposition with said baseplate, and a plurality of connector elements which extend between said baseplate and said leg sections.

8. A coupling assembly as set forth in claim 1 further including a mounting means for at least partially enclosing said socket means, said mounting means including a faceplate having surface means for defining an opening, said socket means including a sleeve which is connected with said retainer means and extends through the opening in said faceplate, said sleeve being movable axially relative to said faceplate to effect operation of said locking means between the locking and release conditions.

9. A coupling assembly as set forth in claim 8 further including spring means for biasing said sleeve axially outwardly to urge said locking means toward the locking condition and flange means projecting from said sleeve in a direction generally parallel to said faceplate at a location outside of said mounting means for facilitating manually moving said sleeve inwardly against the influence of said spring means to facilitate actuation of said locking means to the release condition.

10. A coupling assembly as set forth in claim 9 wherein said flange means has a circular configuration and is disposed in a coaxial relationship with said circular arrays of locking elements and detents.

11. A coupling assembly as set forth in claim 8 further including indicia means disposed on said sleeve for identifying the fluid to be conducted through said coupling assembly and means for holding said sleeve against rotation relative to said faceplate to maintain the angular orientation of said indicia means relative to said faceplate substantially constant.

12. A coupling assembly as set forth in claim 1 wherein said plug includes means for defining first and second annular rings, each of said detents including a side surface which faces inwardly towards the central axis of the circular array of detents and a protuberance which extends inwardly of the side surface toward the central axis of the circular array of detents, said side surface on each of said detents being disposed in abutting engagement with said first annular ring on said plug when said plug is in the storage position.

13. A coupling assembly as set forth in claim 12 wherein said side surface on each of said detents is disposed in abutting engagement with a radially outer portion of said first annular ring when said plug is in the storage position.

14. A coupling assembly as set forth in claim 13 wherein each of said locking elements is disposed in abutting engagement with an axial side portion of said first annular ring when said plug is in the engaged position.

15. A coupling assembly as set forth in claim 14 wherein the axial side portion of said first annular ring engaged by said locking elements when said plug is in the engaged position is on an axial side of said first annular ring towards said second annular ring.

16. A coupling assembly as set forth in claim 1 wherein said socket means includes a housing having surface means for defining a cavity in which said plug is telescopically received, said coupling assembly further including an axially movable sleeve which circumscribes a portion of said housing, said retainer means being connected with a first axial end portion of said sleeve and said detents being connected with a second axial end portion of said sleeve.

17. A coupling assembly as set forth in claim 16 wherein said sleeve is movable axially in a direction toward said housing to move said retainer means away from said locking elements and to move said detents toward said locking elements.

18. A coupling assembly as set forth in claim 17 wherein said detents have surface means for engaging said locking elements upon movement of said sleeve means toward said housing.

19. A coupling assembly as set forth in claim 1 wherein said socket means includes first and second sections, said second section of said socket means being connected with said other conduit, means for releasably interconnecting said first and second sections of said socket means, first valve means for blocking fluid flow through said socket means when said plug is in the disengaged and storage positions, and second valve means for blocking fluid flow through said second section of said socket means when said first section of said socket means is disconnected from said second section of said socket means.

20. A coupling assembly as set forth in claim 19 wherein said second valve means is ineffective to prevent fluid flow through said socket means when said first section of said socket means is connected to said second section of said socket means.

21. A coupling assembly as set forth in claim 19 wherein said first valve means includes a first valve member and a first valve seat, said first valve seat being connected with said first socket section, said second valve means including a second valve member connected to said first member and a second valve seat, said second valve seat being connected with said second socket section.

22. A coupling assembly as set forth in claim 1 wherein said socket means includes an inner socket section adapted to be connected with said other conduit, first indicia means connected with said inner socket section for indicating the type of fluid to be conducted through the pair of conduits, an outer socket section adapted to be connected with said inner socket section, second indicia means connected with said outer socket section for indicating the type of fluid to be conducted through the pair of conduits, means for connecting said outer socket section with said inner socket section, and interlock means for preventing connection of said outer socket section with an inner socket section connected with first indicia means indicating a type of fluid other than the type of fluid indicated by said second indicia means.

23. A coupling assembly for use in connecting a pair of conduits in fluid communication, said coupling assembly comprising a socket assembly adapted to be connected with one of the conduits and to telescopically receive a plug connected with the other conduit, mounting means for mounting said socket assembly on a support structure, said mounting means including a backwall connected with said socket assembly, sidewalls extending transversely to said backwall and disposed alongside said socket assembly and a faceplate connected with and extending transversely to said sidewalls, said faceplate including surface means for defining an opening, said socket assembly including a housing having surface means for defining a cavity in which the plug is telescopically received, a plurality of locking elements mounted on said housing and movable between locking positions engaging the plug to hold it against axial movement relative to said housing and release positions in which said locking elements are ineffective to hold the plug, retainer means for holding said locking elements in their locking positions, sleeve means connected with said retainer means and movable axially relative to said housing between a first position in which said retainer means is effective to hold said locking elements in their locking positions and a second position in which said retainer means is ineffective to hold said locking elements in their locking positions, said sleeve means extending through the opening in said faceplate and having an inner end portion which is disposed on a first side of said faceplate betweeen said faceplate and said backwall and an outer end portion which is disposed on a second side of said faceplate opposite from said first side to enable said sleeve means to be manually moved axially inwardly toward said backwall to move said retainer means from the first position to the second position.

24. A coupling assembly as set forth in claim 23 further including first indicia means disposed on said backwall for indicating the type of fluid to be conducted through the pair of conduits and second indicia means disposed on said outer end portion of said sleeve means for indicating the type of fluid to be conducted through the pair of conduits.

25. A coupling assembly as set forth in claim 23 wherein said sidewalls includes a first pair of flat parallel sidewalls which extend perpendicular to said backwall and said faceplate and a second pair of flat parallel sidewalls which extend perpendicular to said first pair of sidewalls.

26. A coupling assembly as set forth in claim 23 wherein said backwall has a generally circular configuration and said sidewalls project outwardly from spaced apart portions of said backwall.

27. A coupling assembly as set forth in claim 23 wherein said socket assembly includes a rotatable section which is connected with the one conduit and is rotatable relative to said backwall to enable the angular orientation of the one conduit to be changed relative to the backwall.

28. A coupling assembly as set forth in claim 23 wherein said backwall includes a generally cup-shaped section in which said housing is at least partially disposed.

29. A coupling assembly as set forth in claim 23 wherein said socket means further includes a mounting member which is connected to said housing, said mounting member having a body section which at least partially circumscribes said housing and having a plurality of outwardly projecting leg sections and a plurality of connectors for releasably connecting said leg sections to said backwall.

30. A coupling assembly as set forth in claim 23 wherein said sleeve means includes a main section which extends between said inner and outer end portions of said sleeve means, said outer end portion of said sleeve means including a flange which projects outwardly of said main section, said flange having a side surface which is spaced apart from and extends generally parallel to said faceplate, said flange having a cross sectional size in a plane extending parallel to said faceplate which is larger than the cross sectional size of said main section in a plane extending generally parallel to said faceplate.

31. A coupling assembly as set forth in claim 23 further including means extending between said sleeve means and said backwall for holding said sleeve means against rotation relative to said backwall.

32. A coupling assembly as set forth in claim 31 wherein said means extending between said sleeve means and said backwall includes a plurality of legs which are fixedly connected to said sleeve means and have end portions extending into openings formed in said backwall.

33. A coupling assembly as set forth in claim 23 wherein said socket assembly further includes gripper means for holding the plug in said housing with a gripping action which can be overcome by manually pulling the plug away from said socket assembly, said gripper means including a plurality of detents which are connected to said sleeve means for axial movement therewith relative to said housing.

34. A coupling assembly for use in connecting a pair of conduits in fluid communication, said coupling assembly comprising a socket assembly adapted to be connected with one of the conduits and to telescopically receive a plug connected with the other conduit, mounting means for mounting said socket assembly on a support structure, said socket assembly including a housing having surface means for defining a cavity in which the plug is telescopically received, a plurality of locking elements mounted on said housing and movable between locking positions engaging the plug to hold it against axial movement relative to said housing and release positions in which said locking elements are ineffective to hold the plug, retainer means for holding said locking elements in their locking positions, sleeve means connected with said retainer means and movable axially relative to said housing between a first position in which said retainer means is effective to hold said locking elements in their locking positions and a second position in which said retainer means is ineffective to hold said locking elements in their locking positions, said housing having an outer side surface which is slidably engaged by an inner side surface of said sleeve means to support said sleeve means for movement between said first and second positions, said sleeve means including indicia means for identifying the fluid to be conducted through the conduits, and means interconnecting said sleeve means and said mounting means for holding said sleeve means against rotation relative to said mounting means to maintain said indicia means in a predetermined orientation relative to said mounting means, the plug being movable relative to said socket assembly between a disengaged position spaced from said coupling assembly, a storage position in which the plug is supported by said coupling assembly and is telescopically disposed in said housing to a first extent, and an engaged position in which said plug is telescopically disposed in said socket assembly to a second extent which is greater than the first extent and in which the conduits are connected in fluid communication, said socket assembly including gripper means for holding the plug against axial movement from the storage position to the disengaged position with a gripping action which can be overcome by manually pulling the plug away from said socket assembly, said gripper means being mounted on said sleeve means for movement therewith relative to said housing.

35. A coupling assembly as set forth in claim 34 wherein said mounting means includes a backwall connected with said socket assembly, sidewalls extending transversely to said backwall and a faceplate connected with and extending transversely to said sidewalls, said faceplate including surface means for defining an opening, said sleeve means extending through the opening in said faceplate and having an inner end portion which is disposed on a first side of said faceplate and an outer end portion which is disposed on a second side of said faceplate opposite from said first side, said indicia means being disposed on said outer end portion of said sleeve means.

36. A coupling assembly as set forth in claim 34 wherein said socket assembly includes a rotatable connector member adapted to be connected with the one conduit and means for supporting said connector member for rotation relative to said mounting means to enable the angular orientation of the one conduit to be varied relative to said mounting means.

37. A coupling assembly as set forth in claim 34 wherein said means interconnecting said sleeve means and said mounting means includes a plurality of legs which project from one end portion of said sleeve means and extend into openings formed in said mounting means.

38. A coupling assembly as set forth in claim 37 wherein said socket assembly includes first and second sections, said sleeve means being connected with said first section of said socket assembly and said mounting means being connected with said second section of said socket assembly, means for releasably interconnecting said first and second sections of said socket assembly with said legs extending into the openings formed in said mounting means, first valve means for blocking fluid flow through said socket assembly when said first and second sections of said socket assembly are interconnected and the plug is spaced from said socket assembly and second valve means for blocking fluid flow through said second section of said socket assembly when said first section of said socket assembly is disconnected from said second section of said socket assembly, said first valve means being ineffective to block fluid flow when said first section of said socket assembly is disconnected from said second section of said socket assembly.

39. A coupling assembly for use in connecting a pair of conduits in fluid communication, said coupling assembly comprising a socket assembly adapted to be connected with one of the conduits and to telescopically receive a plug connected with the other conduit, mounting means for mounting said socket assembly on a support structure, said socket assembly including a housing having surface means for defining a cavity in which the plug is telescopically received, a plurality of locking elements mounted on said housing and movable between locking positions engaging the plug to hold it against axial movement relative to said housing and release positions in which said locking elements are ineffective to hold the plug, retainer means for holding said locking elements in their locking positions, sleeve means connected with said retainer means and movable axially relative to said housing between a first position in which said retainer means is effective to hold said locking elements in their locking positions and a second position in which said retainer means is ineffective to hold said locking elements in their locking positions, said housing having an outer side surface which is slidably engaged by an inner side surface of said sleeve means to support said sleeve means for movement between said first and second positions, said sleeve means including indicia means for identifying the fluid to be conducted through the conduits, and means interconnecting said sleeve means and said mounting means for holding said sleeve means against rotation relative to said mounting means to maintain said indicia means in a predetermined orientation relative to said mounting means, the plug being movable relative to said socket assembly between a disengaged position spaced from said coupling assembly, a storage position in which the plug is supported by said coupling assembly and is telescopically disposed in said housing to a first extent, and an engaged position in which said plug is telescopically disposed in said socket assembly to a second extent which is greater than the first extent and in which the conduits are connected in fluid communication, said socket assembly including gripper means for holding the plug against axial movement from the storage position to the disengaged position with a gripping action which can be overcome by manually pulling the plug away from said socket assembly, said locking elements being mounted in a circular array on said housing, said gripper means including a plurality of detents mounted in a circular array on said sleeve means, said detents being movable toward and away from said locking elements upon movement of said sleeve means relative to said housing.

40. A coupling assembly as set forth in claim 39 wherein said mounting means includes a backwall connected with said socket assembly, sidewalls extending transversely to said backwall and a faceplate connected with and extending transversely to said sidewalls, said faceplate including surface means for defining an opening, said sleeve means extending through the opening in said faceplate and having an inner end portion which is disposed on a first side of said faceplate and an outer end portion which is disposed on a second side of said faceplate opposite from said first side, said indicia means being disposed on said outer end portion of said sleeve.

41. A coupling assembly as set forth in claim 39 wherein said socket assembly includes a rotatable connector member adapted to be connected with the one conduit and means for supporting said connector member for rotation relative to said mounting means to enable the angular orientation of the one conduit to be varied relative to said mounting means.

42. A coupling assembly as set forth in claim 39 wherein said means interconnecting said sleeve means and said mounting means includes a plurality of legs which project from one end portion of said sleeve means and extend into openings formed in said mounting means.

43. A coupling assembly for use in connecting a pair of conduits in fluid communication, said coupling assembly comprising a socket assembly adapted to be connected with one of the conduits and to telescopically receive a plug connected with the other conduit, mounting means for mounting said socket assembly on a support structure, said socket assembly including a housing having surface means for defining a cavity in which the plug is telescopically received, a plurality of locking elements mounted on said housing and movable between locking positions engaging the plug to hold it against axial movement relative to said housing and release positions in which said locking elements are ineffective to hold the plug, retainer means for holding said locking elements in their locking positions, sleeve means connected with said retainer means and movable axially relative to said housing between a first position in which said retainer means is effective to hold said locking elements in their locking positions and a second position in which said retainer means is ineffective to hold said locking elements in their locking positions, said housing having an outer side surface which is slidably engaged by an inner side surface of said sleeve means to support said sleeve means for movement between said first and second positions, said sleeve means including indicia means for identifying the fluid to be conducted through the conduits, and means interconnecting said sleeve means and said mounting means for holding said sleeve means against rotation relative to said mounting means to maintain said indicia means in a predetermined orientation relative to said mounting means, said mounting means including a backwall connected with said socket assembly, sidewalls extending transversely to said backwall and a faceplate connected with and extending transversely to said sidewalls, said faceplate including surface means for defining an opening, said sleeve means extending through the opening in said faceplate and having an inner end portion which is disposed on a first side of said faceplate and an outer end portion which is disposed on a second side of said faceplate opposite from said first side, said indicia means being disposed on said outer end portion of said sleeve means, said socket assembly including a rotatable connector member adapted to be connected with the one conduit and means for supporting said connector member for rotation relative to said mounting means to enable the angular orientation of the one conduit to be varied relative to said mounting means.

44. A coupling assembly as set forth in claim 43 wherein said socket assembly includes first and second sections, said sleeve means being connected with said first section of said socket assembly and said mounting means being connected with said second section of said socket assembly, means for releasably interconnecting said first and second sections of said socket assembly, first valve means for blocking fluid flow through said socket assembly when said first and second sections of said socket assembly are interconnected and the plug is spaced from said socket assembly and second valve means for blocking fluid flow through said second section of said socket assembly when said first section of said socket assembly is disconnected from said second section of said socket assembly, said first valve means being ineffective to block fluid flow when said first section of said socket assembly is disconnected from said second section of said socket assembly.

45. A coupling assembly for use in connecting a pair of conduits in fluid communication, said coupling assembly comprising a socket assembly adapted to be connected with one of the conduits and to telescopically receive a plug connected with the other conduit, mounting means for mounting said socket assembly on a support structure, said socket assembly including a housing having surface means for defining a cavity in which the plug is telescopically received, a plurality of locking elements mounted on said housing and movable between locking positions engaging the plug to hold it against axial movement relative to said housing and release positions in which said locking elements are ineffective to hold the plug, retainer means for holding said locking elements in their locking positions, sleeve means connected with said retainer means and movable axially relative to said housing between a first position in which said retainer means is effective to hold said locking elements in their locking positions and a second position in which said retainer means is ineffective to hold said locking elements in their locking positions, said housing having an outer side surface which is slidably engaged by an inner side surface of said sleeve means to support said sleeve means for movement between said first and second positions, said sleeve means including indicia means for identifying the fluid to be conducted through the conduits, and means interconnecting said sleeve means and said mounting means for holding said sleeve means against rotation relative to said mounting means to maintain said indicia means in a predetermined orientation relative to said mounting means, said means interconnecting said sleeve means and said mounting means includes a plurality of legs which project from one end portion of said sleeve means and extend into openings formed in said mounting means.

46. A coupling assembly as set forth in claim 45 wherein said socket assembly includes first and second sections, said sleeve means being connected with said first section of said socket assembly and said mounting means being connected with said socket section of said socket assembly, means for releasably interconnecting said first and second sections of said socket assembly with said legs extending into the openings formed in said mounting means, first valve means for blocking fluid flow through said socket assembly when said first and second sections of said socket assembly are interconnected and the plug is spaced from said socket assembly and second valve means for blocking fluid flow through said secnd section of said socket assembly when said first section of said socket assembly is disconnected from said second section of said socket assembly, said first valve means being ineffective to block fluid flow when said first section of said socket assembly is disconnected from said second section of said socket assembly.

47. A coupling assembly as set forth in claim 45 wherein said mounting means includes a backwall connected with said socket assembly, sidewalls extending transversely to said backwall and a faceplate connected with and extending transversely to said sidewalls, said faceplate including surface means for defining an opening, said sleeve means extending through the opening in said faceplate and having an inner end portion which is disposed on a first side of said faceplate and an outer end portion which is disposed on a second side of said faceplate opposite from said first side, said indicia means being disposed on said outer end portion of said sleeve means.

48. A coupling assembly as set forth in claim 45 wherein said socket assembly includes a rotatable connector member adapted to be connected with the one conduit and means for supporting said connector member for rotation relative to said mounting means to enable the angular orientation of the one conduit to be varied relative to said mounting means.

49. A coupling assembly as set forth in claim 45 wherein said mounting means includes a backwall, sidewalls extending transversely to said backwall, and a faceplate connected with and extending transversely to said sidewalls, said backwall including surface means for defining a plurality of openings, said legs extending from said one end portion of said sleeve means into the openings formed in said backwall.

50. A coupling assembly for use in connecting a pair of conduits in fluid communication, said coupling assembly comprising a plug adapted to be connected with one of the conduits, said plug including a leading end portion having a circular cross sectional configuration in a plane extending perpendicular to a central axis of said plug and a shank portion having a noncircular cross sectional configuration in a plane extending perpendicular to the central axis of said plug, socket means adapted to be connected with the other conduit, said socket means including surface means for defining a cavity to telescopically receive the leading end portion and the shank portion of said plug, mounting means for mounting said socket means on a support structure, said mounting means including a baseplate and means for connecting said socket means with said baseplate, first indicia means disposed on said baseplate for indicating the type of fluid to be conducted through the pair of conduits, and second indicia means disposed on said socket means for indicating the type of fluid to be conducted through the pair of conduits, said socket means including a housing in which at least a portion of said cavity is disposed, a circular array of locking elements mounted on said housing and movable between release positions and locking positions extending into the cavity to engage the leading end portion of said plug to hold said plug in said cavity, sleeve means disposed on said housing and movable between a first position in which said locking elements are held in their locking positions and a second position in which said locking elements are movable to their release positions, said surface means being at least partially disposed within said sleeve means and defining a portion of the cavity having a cross sectional configuration corresponding to the cross sectional configuration of said sleeve means, said second indicia means being disposed on said sleeve means, said socket and mounting means including means for holding said sleeve means against rotation relative to said baseplate to maintain said second indicia means in a predetermined orientation relativve to said baseplate, said means for holding said sleeve means against rotation relative to said baseplate includes a surface means defining a plurality of openings in said baseplate and a plurality of legs extending from one end of said sleeve means into the openings in said baseplate.

51. A coupling assembly as set forth in claim 50 wherein said sleeve means includes gripper means for holding said plug in a storage position in said socket assembly with a gripping action which can be overcome manually by pulling said plug away from said socket assembly, said locking elements being ineffective to hold said plug against movement relative to said socket assembly when said plug is in the storage position.

52. A coupling assembly as set forth in claim 51 wherein said gripper means includes a circular array of detents circumscribed by said sleeve means, said detents including surface means for engaging said locking elements to effect movement of said locking elements from their locking positions to their release positions upon movement of said sleeve means from the first position to the second position.

53. A coupling assembly for use in connecting a pair of conduits in fluid communication, said coupling assembly comprising a plug adapted to be connected with one of the conduits, socket means adapted to be connected with the other conduit, said socket means including housing means defining a cavity to telescopically receive said plug, locking means operable between a locking condition holding said plug against axial movement and a release condition in which said locking means is ineffective to hold said plug against axial movement, and sleeve means which is axially movable relative to said housing means to effect operation of said locking means between the release and locking conditions, said sleeve means including a plurality of legs which extend from one end portion of said sleeve means, and mounting means for mounting said socket means on a support structure, said mounting means including a baseplate and connector means for connecting said socket means with said baseplate, said connector means being operable between a first condition in which said housing means is loosely connected with said baseplate and a second condition in which said housing means is tightly connected with said baseplate, said socket means including a rotatable connector member adapted to be connected with said other conduit, said connector member including passage means for conducting fluid from said other conduit to said housing means, said connector member being rotatable relative to said baseplate when said connector means is in said first condition to enable the orientation of said other conduit to be changed relative to said baseplate, said connector member being held against rotation relative to said baseplate when said connector means is in said second condition to maintain the orientation of said other conduit relative to said baseplate substantially constant, said baseplate including surface means for defining a plurality of openings into which said legs extend to hold said sleeve means against rotation relative to said baseplate.

54. A coupling assembly as set forth in claim 53 further including first indicia means disposed on said baseplate and second indicia means disposed on said sleeve means for identifying the fluid to be connected through said plug and socket means.

55. A coupling assembly as set forth in claim 53 wherein said mounting means includes a faceplate having surface means defining an opening, said sleeve means extending through the opening in said faceplate so that said one end portion of said sleeve means is disposed on a first side of said faceplate and a second end portion of said sleeve means is disposed on a second side of said faceplate.

56. A coupling assembly as set forth in claim 53 wherein said sleeve means includes gripper means for holding said plug in a storage position in said socket means with a gripping action which can be overcome manually by pulling said plug away from said socket means, said locking means being ineffective to hold said plug against movement relative to said socket means when said plug is in the storage position.

57. A coupling assembly as set forth in claim 56 wherein said gripper means includes a circular array of detents circumscribed by said sleeve means.

58. A coupling assembly for use in connecting a pair of conduits in fluid communication, said coupling assembly comprising an inner socket section adapted to be connected with one of the conduits, first indicia means connected with said inner socket section for indicating the type of fluid to be conducted through the pair of conduits, an outer socket section adapted to be connected with said inner socket section, said outer socket section including a housing, a plurality of locking elements disposed on said housing and movable between locking positions engaging a plug connected with the other one of the conduits and release positions, sleeve means disposed on said housing and movable between a first position in which said locking elements are held in their locking positions and a second position in which said locking elements are movable to their release positions, second indicia means connected with said outer socket section for indicating the type of fluid to be conducted through the pair of conduits, means for connecting said outer socket section with said inner socket section, and interlock means for preventing connection of said outer socket section with an inner socket section connected with a first indicia means indicating a type of fluid other than the type of fluid indicated by said second indicia means, said interlock means including a first plurality of interlock elements connected with said sleeve means and a second plurality of interlock elements connected with said inner socket section.

59. A coupling assembly as set forth in claim 58 wherein said first plurality of interlock elements includes a plurality of legs extending from one end portion of said sleeve means and said second plurality of interlock elements includes surface means for defining a plurality of openings in which said legs are received.

60. A coupling assembly as set forth in claim 58 wherein said second indicia means is disposed on said sleeve means, said first plurality of interlock elements cooperating with said second plurality of interlock elements to hold said sleeve means in a predetermined orientation relative to said inner socket section.

61. A coupling assembly as set forth in claim 58 wherein said outer socket section includes gripper means for holding the plug against axial movement with a gripping action which can be overcome by manually pulling the plug away from said outer socket section, said gripper means including a circular array of detents which is circumscribed by and connected with said sleeve means.

62. A coupling assembly as set forth in claim 61 wherein said detents include surface means for engaging said locking elements upon movement of said sleeve means from its first position to its second position.

63. A coupling assembly as set forth in claim 58 further including mounting means connected with said inner socket section for mounting said socket assembly on a support structure, said mounting means including a faceplate having surface means for defining an opening through which said sleeve means extend when said outer socket section is connected with said inner socket section.

64. A coupling assembly as set forth in claim 63 wherein said first indicia means is disposed on said mounting means and said second indicia means is disposed on said sleeve means.

65. A coupling assembly for use in connecting a pair of conduits in fluid communication, said coupling assembly comprising an inner socket section adapted to be connected with one of the conduits, first indicia means connected with said inner socket section for indicating the type of fluid to be conducted through the pair of conduits, an outer socket section adapted to be connected with said inner socket section, second indicia means connected with said outer socket section for indicating the type of fluid to be conducted through the pair of conduits, means for connecting said outer socket section with said inner socket section, interlock means for preventing connection of said outer socket section with an inner socket section connected with a first indicia means indicating a type of fluid other than the type of fluid indicated by said second indicia means, mounting means for mounting said inner socket section on a support structure, said mounting means including a baseplate, said connector means being operable between a first condition in which said inner socket section is loosely connected with said baseplate to enable the orientation of the one conduit to be changed relative to said baseplate and a second condition in which said inner and outer socket sections are tightly connected with said baseplate to maintain the orientation of said outer socket section and said one conduit relative to said baseplate substantially constant.

66. A coupling assembly for use in connecting a pair of conduits in fluid communication, said coupling assembly comprising a socket assembly adapted to be connected with one of the conduits and to telescopically receive a plug connected with the other conduit, said socket assembly including a housing having surface means for defining a cavity in which the plug is telescopically received, a plurality of locking elements mounted on said housing and movable between locking positions engaging the plug to hold it against axial movement relative to said housing and release positions in which said locking elements are ineffective to hold the plug, retainer means for holding said locking elements in their locking positions, sleeve means connected with said retainer means and movable axially relative to said housing between a first position in which said retainer means is effective to hold said locking elements in their locking positions and a second position in which said retainer means is ineffective to hold said locking elements in their locking positions, said sleeve means including indicia means disposed on an outer end portion of said sleeve means for identifying the fluid to be conducted through the conduits, mounting means for mounting said socket assembly on a support structure, said mounting means including a backwall connected with said socket assembly, sidewalls extending tranversely to said backwall and a faceplate connected with and extending transversely to said sidewalls, said faceplate including surface means for defining an opening, said sleeve means extending through the opening in said faceplate and having an inner end portion which is disposed on a first side of said faceplate, said outer end portion of said sleeve means and said indicia means being disposed on a second side of said faceplate opposite from said first side, and means interconnecting said sleeve means and said mounting means for holding said sleeve means against rotation relative to said faceplate during axial movement of said sleeve means to maintain said indicia means in a predetermined orientation relative to said faceplate.

67. A coupling assembly as set forth in claim 66 wherein said sleeve means includes a main section which extends through said faceplate between said inner and outer end portions of said sleeve means, said outer end portion of said sleeve means including a flange which projects outwardly of said main section, said flange having a cross sectional size in a plane extending parallel to said faceplate which is larger than the cross sectional size of said main section in a plane extending generally parallel to said faceplate.

* * * * *